United States Patent [19]

Hansen et al.

[11] Patent Number: 4,748,036

[45] Date of Patent: May 31, 1988

[54] METHOD OF FILLING FLAT STOCK FIBROUS CELLULOSIC FOOD CASINGS CONTAINING A LOW LEVEL OF TOTAL PLASTICIZER

[75] Inventors: James R. Hansen, Tinley Park; Jerome J. M. Rasmussen, Burbank, both of Ill.

[73] Assignee: Viskase Corporation, Chicago, Ill.

[21] Appl. No.: 102,686

[22] Filed: Sep. 30, 1987

Related U.S. Application Data

[62] Division of Ser. No. 822,864, Jan. 27, 1986.

[51] Int. Cl.$^4$ .................... A22C 11/00; A22C 13/00
[52] U.S. Cl. .................................................. 426/413
[58] Field of Search .............. 426/105, 135, 410, 413; 428/36, 191, 311.7; 206/802; 138/118.1; 264/187; 106/163.1

[56] References Cited

U.S. PATENT DOCUMENTS

| | | | |
|---|---|---|---|
| 4,163,463 | 8/1979 | O'Brien | 426/105 |
| 4,198,325 | 4/1980 | Hammer et al. | 428/36 |
| 4,546,023 | 10/1985 | Kastl et al. | 138/118.1 |

FOREIGN PATENT DOCUMENTS 1180939 4/1982 Canada .
3220488 5/1982 Fed. Rep. of Germany .

*Primary Examiner*—Arthur L. Corbin
*Attorney, Agent, or Firm*—John C. LeFever

[57] ABSTRACT

This invention relates to flat stock fibrous cellulosic food casings containing a low plasticizer level of between about 10 wt. % and about 17 wt. %, including at least about 9 wt. % polyol, both based upon the bone dry weight of cellulose in the casing, together with a method of making the casing and a method of filling the casing.

4 Claims, No Drawings

METHOD OF FILLING FLAT STOCK FIBROUS CELLULOSIC FOOD CASINGS CONTAINING A LOW LEVEL OF TOTAL PLASTICIZER

This application is a division of prior U.S. application Ser. No. 822,864, filing date Jan. 27, 1986.

FIELD OF THE INVENTION

The present invention relates generally to polyol-containing flat stock fibrous cellulosic food casings and, more specifically, to such casings having low total plasticizer levels of between about 10 wt. % and about 17 wt. %, including at least about 9 wt. % polyol, both based upon the bone dry weight of cellulose in the casings.

BACKGROUND OF THE INVENTION

Non-fibrous cellulosic food casings containing about 20 wt. % of total plasticizer based upon the bone dry weight of cellulose in the casings are known in the prior art. By way of illustration, O'Brien U.S. Pat. No. 4,163,463 discloses non-fibrous shirred casings having a glycerine content of between 15 wt. % and 20 wt. % on a moisture-free basis, which is equivalent to between about 18 wt. % and about 25 wt. % based on the bone dry weight of cellulose in the casing, and a moisture content of 10 to 15 wt. % based upon total casing weight, which is equivalent to from about 12 to about 20 wt. % based upon the bone dry weight of cellulose in the casing. The glycerine is used in this patent as a plasticizer for the casing.

The O'Brien '463 patent also discloses in column 7, lines 19 to 21, that the conventional glycerine level may be cut in half for non-fibrous, shirred casing when a supplemental oxazoline wax plasticizer is also employed. O'Brien teaches that the oxazoline wax plasticizer must be added to the viscose with an emulsifier so that the wax plasticizer is thoroughly dispersed when the viscose is regenerated into cellulose.

Hammer et al U.S. Pat. No. 4,198,325 discloses a required primary alkyl derivative plasticizer in combination with an optional secondary plasticizer (e.g. a polyol) in cellulosic fibrous food casing. The primary plasticizer is broadly disclosed as being present in an amount of between about 0.5 and about 40 wt. % of the amount of cellulose in the fibrous casing, preferably between about 5 and about 20% by weight of the cellulose in the casing (column 10 of Hammer). However, the illustrative examples given at columns 8 and 9 of Hammer all contain total plasticizer levels (items 2 and 5 of the examples) that calculate to be above 20 wt. % of the bone dry weight of cellulose in the casing.

Shirred cellulosic fibrous food casings having very low total plasticizer levels and very high moisture levels have been disclosed in the art. For example, German patent publication DE No. 3220488A1 discloses shirred, cellulosic casing having 0 wt. % to 40 wt. %, and preferably having 10 wt. % to 35 wt. % of glycerine plasticizer and having 35 to 80 wt. % of moisture, all wt. % values being based upon the weight of the bone dry cellulose in the casing.

As an additional illustration, Bridgeford Canadian Patent No. 1,180,939 discloses shirred non-fibrous cellulosic frankfurter casings containing a glycerine plasticizer in an amount of from 0 wt. % to 10 wt. % based upon the dry weight of cellulose in the casing.

It must be noted that in certain respects nonfibrous cellulosic casing and fibrous cellulosic casing are non-analogous. Nonfibrous casing derives its strength and performance properties solely from the molecular interaction of the regenerated cellulose molecules. In contrast, fibrous casing derives its strength from both the fiber structure of the paper web substrate as well as the fiber-to-cellulose molecular bonding, and it thereby achieves strength which is superior to the inherent strength of either the fibrous paper web alone or the regenerated cellulose alone.

This invention relates to flat stock cellulosic casing as distinguished from shirred cellulosic casing. In a preferred embodiment the invention relates to cut flat stock cellulosic casing and, as used herein, "cut" refers to flat stock casing which, when mounted on the horn of the stuffing machine, has a total length not exceeding about 100 inches. The cutting may be done by the casing manufacturer prior to sale, or the casing may be sold in the reel form and later be cut by the food processor or an agent of the food processor.

Heretofore, to the best of our knowledge, flat stock cellulosic fibrous food casings, having a total plasticizer content below 20 wt. % based on the bone dry weight of cellulose in the casing, have not been commercially used. Commercial flat stock cellulosic fibrous casing has conventionally employed about 30 wt. % of total plasticizer (e.g., polyol) based upon the bone dry cellulose weight. It is speculated that there is an important technical reason why such a high level of total plasticizer, e.g. 30 wt. % based upon bone dry cellulose weight, has been conventionally employed as the plasticizer in flat stock casing. Because conventional commercial flat stock fibrous casing has a moisture level of only about 6 to 10 wt. % based upon bone dry cellulose, in contrast to conventional commercial shirred fibrous casing which has a typical moisture level of 30 to 50 wt. % based upon bone dry cellulose, flat stock fibrous casing is very brittle and easily damaged. Since flat stock fibrous casings must be subjected to several processing and handling operations before stuffing the casing with food product, including cutting, pre-sticking, and tying operations, heretofore the industry has believed that only by maintaining a high total plasticizer level of about 30 wt. % will the low moisture flat stock fibrous casing be able to withstand the rigors of these processing operations. In addition to acting as a plasticizer for the flat stock fibrous casing, it was believed that a high plasticizer (e.g, polyol) level was needed as a humectant, so that moisture loss would be minimized prior to these processing steps. Thus, only high plasticizer (e.g., glycerine) levels have been commercially used in flat stock fibrous cellulosic casing, despite the fact that plasticizers such as glycerine are expensive and that lower plasticizer levels would result in casing production cost savings.

OBJECTS OF THE INVENTION

It is an object of the present invention to provide a flat stock cellulosic fibrous casing containing a low level of total plasticizer as compared to present commercial practice.

It is another object of the present invention to provide a flat stock cellulosic fibrous casing having a reduced regenerated cellulose content and a reduced total plasticizer content, but having comparable burst strength as compared to conventional flat stock plasticized cellulosic fibrous casing.

It is yet another object of the present invention to provide a flat stock cellulosic fibrous casing having a lighter basis weight paper while retaining a burst strength which is comparable to the burst strength of prior art casing having a conventional heavier basis weight paper substrate.

It is a further and more specific object of the present invention to provide a cut flat stock cellulosic fibrous food casing that has performance characteristics which are comparable to prior art cut flat stock cellulosic fibrous food casings, but which is cheaper than such prior art casings.

Still another object of this invention is to provide a method of manufacturing a flat stock cellulosic fibrous casing containing a low level of total plasticizer.

A still further object of this invention is to provide a method of manufacturing a food product within a cut flat stock cellulosic fibrous casing.

These and other objects will become apparent by a reading of the instant specification.

SUMMARY OF THE INVENTION

The present invention relates to a flat stock cellulosic fibrous food casing containing at least one plasticizer, including water-soluble and water-insoluble plasticizers, and combinations thereof, in a total amount of between about 10 wt. % and about 17 wt. %, including at least 9 wt. % polyol, both based upon the weight of bone dry cellulose in the casing. Typically, the flat stock fibrous casing of the present invention may comprise a single polyol plasticizer or a mixture of polyols, such as for example, glycerine and propylene glycol. Alternatively, the total plasticizer may comprise a mixture of at least 9 wt. % polyol and a smaller guantity of a non-polyol plasticizer such as oxazoline wax.

In another aspect, the invention relates to a method of manufacturing a flat stock cellulosic fibrous food casing which comprises the step of adding at least one plasticizer to the casing, in an amount sufficient to provide a total plasticizer content in the casing of between about 10 wt. % and about 17 wt. %, including at least 9 wt. % polyol, both based upon the weight of bone dry cellulose in the casing.

In yet another aspect, the invention relates to a method of manufacturing a flat stock cellulosic fibrous food casing which comprises the steps of:

a. forming a fibrous web into a tuhe, b. annularly extruding viscose onto said tube, said viscose containing at least one water-insoluble plasticizer in an amount of between about zero and about 8 wt. % based upon the weight of bone dry cellulose in the casing, c. passing said viscose coated tube through a regenerating bath to convert the viscose to regenerated cellulose to form a cellulosic gel stock fibrous tube, d. incorporating into said cellulosic gel stock fibrous tube at least one water-soluble plasticizer in an amount of between zero and about 17 wt. % based upon the weight of bone dry cellulose in the casing to provide a plasticized cellulosic gel stock fibrous tube, e. drying said plasticized gel stock fibrous tube to provide a dried fibrous tube and f. incorporating into said dried fibrous tube at least one water-soluble plasticizer in an amount of between zero and about 17 wt. %, based upon the weight of bone dry cellulose in the casing, with the proviso that the total amount of said plasticizers added in steps b, d and f is between about 10 wt. % and about 17 wt. %, including at least about 9 wt. % polyol, both based upon the weight of bone dry cellulose in the casing.

Alternatively, a fibrous web can be treated as in steps (b) through (f) and formed into a tube after step (f).

This invention also relates to a method of manufacturing a food product in a flat stock fibrous casing wherein the casing is provided with a total plasticizer content of between about 10 wt. % and about 17 wt. %, including at least about 9 wt. % polyol. The casing also includes at least about 8 wt. % water, all of these weight requirements being based upon the weight of bone dry cellulose in the casing. One end of the casing is mounted on a stuffing machine and the casing is filled with edible material. The edible material-filled casing is then processed to convert the edible material to a finished food product.

Another aspect of this invention relates to a method of manufacturing a food product in a cut flat stock fibrous casing. In this method a cut length of flat stock fibrous casing is provided with one closed end and one open end. The casing has a total plasticizer content of between about 10 wt. % and about 17 wt. %, including at least 9 wt. % polyol, and between about 35 wt. % and about 72 wt. % water, all based upon the weight of bone dry cellulose in the casing. This casing is the "no-soak" type, ie. ready for stuffing without further moisturization to the fully soaked or saturated condition as is typically accomplished on prior art casing by dipping in a water tank. The preferred water content depends on the type of edible material to be stuffed. For bologna, the preferred moisture content of the cut flat stock fibrous casing is between about 35 wt. % and about 53 wt. %, and for ham the preferred moisture content is between about 43 wt. % and about 72 wt. % moisture, all based upon the weight of bone dry cellulose in the casing.

In this method the open end of the aforedescribed casing is mounted on a stuffing machine and the so-mounted casing is filled with edible material, as for example bologna emulsion or ham chunks. The open end of the edible-filled casing is closed as by tying or clipping, and the closed casing is removed from the stuffing machine and processed (cooked) to convert the edible material to a finished food product. The casing can then he removed. as is well understood by those skilled in the meat processing art.

DETAILED DESCRIPTION OF THE INVENTION

It has been unexpectedly found that a functionally equivalent but less costly flat stock fibrous casing article may be provided by employing low levels of total plasticizer of between about 10 wt. % and about 17 wt. %, and preferably between about 11 wt. % and about 15 wt. %, including at least 9 wt. % polyol, both based on the weight of bone dry cellulose in the casing.

Prior to the present invention, reduction in the total plasticizer, e.g. the glycerine level of conventional casing would have been expected to result in reduced manufacturing materials cost, but it would also have been expected to cause a corresponding decrease in casing performance characteristics, viz. tearing and breaking of the casing, blown ends, and the like.

It has now been surprisingly found that flat stock fibrous casing containing between about 10 wt. % and about 17 wt. % total plasticizer, including at least 9 wt. % polyol, both based upon the bone dry weight of the cellulose in the casing, provides at least comparable performance characteristics as compared to the high total plasticizer content casing now in commercial use. These comparisons include casing durability tests, such as stuffing tests where breakage frequency is measured, and casing processing tests where splits in the casing during cooking and smoking are measured, as compared to conventional commercial flat stock cellulosic fibrous casing having about 30 wt. % glycerine, based upon the bone dry weight of cellulose in the casing (hereinafter "BDC"). Since plasticizers such as glycerine are an expensive component of conventional flat stock fibrous casings, a significant cost savings is provided by using the reduced total plasticizer levels of the Present invention of up to about 17 wt. %. Higher plasticizer contents do not provide performance advantages. Also, since casing burst pressure declines with increasing plasticizer content, levels below 17 wt. % provide stronger casings. However, the total plasticizer level should not be below about 10 wt. % since breakage is encountered during stuffing and processing when the total plasticizer level is below about 10 wt. %. The flat stock fibrous casing of this invention includes at least 9 wt. % polyol plasticizer in order to provide adequate performance characteristics for the plasticized casing. Lower levels of polyol (hence higher levels of nonpolyol) in the total plasticizer interferes with the hydrogen bonding of the cellulose molecules in the casing, thereby reducing the strength of the casing. Also, it has been discovered that the first tie survival (as measured with the Tipper Tie Senior Capper Machine) diminishes if the polyol plasticizer is reduced below 9 wt. %.

Moreover, it has now been found that by reducing the total plasticizer level of flat stock fibrous casing to between about 10 and about 17 wt. %, with at least 9 wt. % polyol plasticizer, an unexpected increase in casing burst strength is achieved. This increased burst strength makes it possible to reduce the amount of regenerated cellulose added to a fibrous web in the manufacture of fibrous casing, while still providing a casing having adequate burst strength. The reduction in amount of regenerated cellulose can be as much as 10 wt. %, as compared to prior art fibrous cellulosic casings. Alternatively, the paper basis weight of the fibrous web itself can be reduced vis-a-vis prior art paper usage, while still providing a casing having adequate burst strength. For example, the paper weight in lbs. per ream of a paper fibrous web can be reduced from about 16 lbs. per ream to about 14.5 lbs. per ream when manufacturing fibrous cellulosic casing having about 11 wt. % plasticizer as compared to the conventional 30 wt. % plasticizer. It is believed that reducing the plasticizer content of the casing results in increased cellulose to cellulose hydrogen bonding during the drying of the casing, which thereby results in higher burst strength.

The aforedescribed invention is particularly surprising in view of our expectation that insufficient organic plasticizer content would be overcome by increasing the moisture content of the flat stock cellulosic fibrous casing. More particularly, it has been discovered that if the polyol plasticizer content is below about 9 wt. % BDC, the supplemental softening effects of increased moisture content do not afford a functional casing article.

The casings of the present invention are preferably large-size (at least 40 mm in diameter), fibrous casings. The casings are commonly "pre-stuck" with tiny pinholes to vent air accumulation during a subsequent stuffing operation. The pinholes also allow excess water and fat to be eliminated from the encased meat product during subsequent processing.

Generally, the casings of the present invention have a moisture content of less than about 25 wt. % based upon the bone dry weight of cellulose in the casing. The casings preferably have a water content of between about 8 wt. % and about 21 wt. %, and more preferably between about 10 wt. % and about 15 wt. %, based upon the bone dry weight of cellulose in the casing. The amount of water in the casing Preferably is maintained below about 21 wt. %, based upon the bone dry weight of cellulose in the casing, in order to minimize the risk of poor pleat formation when applying the first tie, as shall be shown hereinafter. When presticking the casing of the present invention, the amount of water in the casing preferably is maintained above about 8 wt. %, based upon the bone dry weight of the cellulose in the casing, in order to minimize the risk of casing strength loss caused by the presticking operation, and thereby minimize the risk of casing failure during the subsequent stuffing of the casing.

As used herein the term "plasticizer" is meant to refer to organic chemicals which perform a plasticizing function i.e., provide enhanced pliability, softening, and/or stretchability to the casing. Preferred plasticizers are water soluble compounds, such as polyols and glycol ethers available from Union Carbide Corporation, Old Ridgebury Road, Danbury, under the trademark CELLOSOLVE. Also, as used herein the term "polyol" refers to polyhydroxy compounds such as glycerine, sorbitol, triethylene glycol and propylene glycol. One or more polyols comprise at least 9 wt. % of the casing article of this invention, based upon the weight of bone dry cellulose in the casing. The preferred polyol plasticizer is glycerine.

Water-soluble plasticizers, including polyols, are incorporated into the gel stock or dry stock, or combinations thereof, during the method of manufacturing casing in accordance with invention. Water-insoluble plasticizers are generally incorporated into the viscose during manufacture of the casing. The water-soluble and water-insoluble plasticizers can be used singly or in combination depending upon the particular application.

The polyol plasticizer is incorporated into the casing during manufacture by passing the gel stock casing through an aqueous bath containing the plasticizer. The plasticized gel stock casing is then passed through a drying process for removal of excess moisture to provide a dry stock casing. During the drying step, some of the plasticizer may be lost due to vaporization. Accordingly, it is occasionally desirable to add a portion of the polyol plasticizer to the dry stock casing in order to produce a final product casing which contains the desired level of polyol plasticizer.

In preferred practice of the invention, about 10 wt. % BDC of a polyol plasticizer is incorporated into the gel stock casing by immersion in an aqueous bath containing the plasticizer, which typically is glycerine. The partially plasticized gel stock casing is then passed through a conventional drying process for removal of excess moisture to achieve a moisture level of 7-10 wt. % BDC. After this step, about 3 wt. % BDC of propylene glycol is added to the dry stock casing along with about 7 wt. % BDC moisture to produce a flat stock casing containing about 13 wt. % BDC total polyol plasticizer and about 14-17 wt. % BDC moisture content. In addition to a plasticizer function, the propylene glycol serves to retard the rate of water absorption in order to enhance uniform water distribution in the casing.

Other ingredients may be incorporated into the flat stock cellulosic fibrous food casing. These minor ingredients can include humectants, pigments, lubricants and surface coatings, such as peeling and adhesion agents, as well as other conventional minor additives.

As used herein, a "humectant" is a material having a physicochemical attraction for water. In this invention, the term "humectant" is not intended to refer to materials which perform a plasticizing function. Useful humectants include inorganic salts, amines and amides, such as urea and formamide. Humectants may, for example, be incorporated in the casing by addition to the aqueous bath containing the plasticizer.

The plasticized flat stock casing of this invention may be a reel stock casing supply or it may be a discrete cut length of flat stock casing. The cut flat stock casing length may be closed at one end with a closure, such as a plastic loop, string loop or metal cap, in preparation for a subsequent stuffing operation.

The following examples are intended to illustrate, but in no way limit, the present invention. As used herein, reference to wt. % plasticizer or moisture, based upon bone dry cellulose, means that the weight of the plasticizer or water, as the case may be, in the casing is divided by the absolute weight of the cellulose in the casing. Additionally, for simplicity in reporting the data in the examples and in the tables, the term "wt. % of bone dry cellulose" is abbreviated to "wt % BDC" or "% BDC".

EXAMPLE 1

The purpose of this example is to show that the flat stock fibrous casing strength increases as its polyol, eg. glycerine, content is decreased.

Several cut flat stock fibrous casing samples of varying sizes containing varying levels of glycerine were prepared by conventional means. The amount of glycerine that was incorporated into the casing was varied by varying the contact time of the casing with the glycerine in the glycerine bath. Sample A cut flat stock fibrous casing had a recommended stuffed diameter of 2.38 inches. The recommended stuffed diameter of Sample B was 4.79 inches and that of Sample C was 3.67 inches.

In order to determine the strength of these casing samples, they were subjected to the burst pressure test after having been fully soaked for at least one hour in a vessel containing water. The burst pressure test was done by inflating the casing with air until it burst, and automatically recording the pressure at which the casing burst in millimeters of mercury.

The results of the test are summarized in Table I. As shown in the Table, the casing strength, as represented by the burst pressure, increases as the glycerine content is decreased. More specifically, the burst pressure values for Casing Sample C demonstrate the burst pressure superiority of two casings within the scope of the present invention, having glycerine levels of 10.4 and 16.4 wt. % of BDC, respectively, as compared to two casings outside of the scope of the present invention, having glycerine levels of 20.7 and 23.8 wt. % of BDC, respectively. That is, flat stock fibrous casings with total plasticizer content up to about 17% of BDC have higher burst pressures than casings with higher plasticizer content.

TABLE I

CASING STRENGTH AS A FUNCTION OF GLYCERINE CONTENT

| Casing Sample | Glycerine Content (% BDC) | Burst Pressure* (mm Hg) |
| --- | --- | --- |
| A        | 29.3 | 687 |
| (N = 10)* | 25.8 | 707 |
|          | 23.1 | 704 |
|          | 22.0 | 709 |
|          | 10.5 | 726 |
| B        | 29.3 | 311 |
| (N = 10) | 21.8 | 318 |
|          | 9.6  | 337 |
| C        | 23.8 | 477 |
| (N = 15) | 20.7 | 479 |
|          | 16.4 | 492 |
|          | 10.4 | 501 |

*Pressures are arithmetic averages of multiple determinations. (N = 10) means ten samples averaged.

EXAMPLE 2

This example shows that reducing the total plasticizer content of the casing makes it possible to reduce the cellulose add-on during the manufacture of the fibrous casing as commercially practiced. The cellulose "add-on" is the amount of regenerated cellulose which is added to the fibrous web (paper substrate) in the manufacture of fibrous cellulosic casing.

Several cut flat stock fibrous casing samples of varying sizes were made which contain reduced cellulose add-ons and reduced glycerine contents. Sample D had a recommended stuffed diameter of 2.97 inches, Sample E had a recommended stuffed diameter of 3.67 inches, and Sample F had a recommended stuffed diameter of 4.15 inches. After fully soaking these casings, they were subjected to the burst pressure test as described in Example 1. The results of this test are summarized in Table II.

The results show that reducing the glycerine content in the casing permits the use of a reduced regenerated cellulose add-on without significant change in burst strength.

TABLE II

CASING BURST STRENGTH AS A FUNCTION OF GLYCERINE CONTENT AND REGENERATED CELLULOSE ADD-ON REDUCTION

| CASING SAMPLE | GLYCERINE CONTENT (% BDC) | CELLULOSE ADD-ON REDUCTION (%) | BURST PRESSURE* (MM OF HG) |
| --- | --- | --- | --- |
| D | 32.0 | 0.0  | 577 |
|   | 11.4 | 5.0  | 587 |
|   | 11.8 | 10.0 | 576 |
| E | 29.4 | 0.0  | 460 |
|   | 11.8 | 5.0  | 486 |
|   | 13.3 | 10.0 | 466 |
| F | 28.9 | 0.0  | 443 |
|   | 9.6  | 5.0  | 482 |
|   | 9.8  | 10.0 | 461 |

*Pressures are arithmetic averages of five determinations.

EXAMPLE 3

This example illustrates that by reducing total plasticizer content of the casings, light basis weight papers can be substituted for heavier basis weight papers without adversely affecting burst strength.

Cut flat stock fibrous casing samples of the same size were prepared using two different basis weight papers.

Varying levels of glycerine were incorporated into the casings during their manufacture. The samples had a recommended stuffed diameter of 4.79 inches.

After fully soaking the casing samples, they were subjected to the burst pressure test in accordance with the procedure described in Example 1. The resulting casing burst strengths are displayed in Table III. As shown in Table III, the burst-strength of a commercial cut flat stock fibrous casing made from a paper whose basis weight is 15.93 lb/ream and having a conventional glycerine content of 30.2 wt. %, based on the weight of dry cellulose in the casing, is 389 mm of Hg. A cut flat stock fibrous casing having equivalent strength, namely a burst pressure of 387 mm of Hg, can be made from 14.7 lb/ream basis weight paper by reducing the amount of glycerine in the casing to about 10 wt. % based upon the weight of dry cellulose in the casing.

TABLE III
CASING STRENGTH AS A FUNCTION OF GLYCERINE CONTENT AND PAPER REAM WEIGHT

| Paper Weight (Lb/Ream) | Glycerine Content (% BDC) | Burst-Pressure* (mm of Hg) |
| --- | --- | --- |
| 15.9 | 30.2 | 389 |
| 14.7 | 29.4 | 371 |
| 14.7 | 23.3 | 382 |
| 14.7 | 10.1 | 387 |

*Pressures are arithmetic averages of ten determinations.

EXAMPLE 4

One purpose of this example is to demonstrate the effect of total plasticizer content on the flat stock fibrous casing stuffing performance. Another purpose of this example is to determine the effect of increased moisture content on casing stuffing performance at relatively low total plasticizer content.

Ten cut flat stock fibrous casing samples having a recommended stuffed diameter of 3.67 inches were made at each of three levels of glycerine. The samples were fully soaked with water and then were stuffed with bologna meat emulsion to a 3.68 inch target diameter by means of a Model B PRECISION Sizer. This stuffing machine is supplied to the processed meats industry by Union Carbide Corporation. The machine and its operation are described in U.S. Pat. Nos. 3,457,588 and 3,553,769. Diameters of the resulting encased meat products were recorded at the mid-points of the stuffed product length. The stuffed product lengths were then processed in a smoke house under conventional operating conditions to produce finished bologna sausage product.

The description of the cut flat stock fibrous casing samples and the results of the stuffing test for an average of ten pieces of each sample are summarized in Table IV. The data indicates that the ability to stuff to target diameter with reduced casing total plasticizer (glycerine) content was not adversely affected. No stuffing or processing breakage was detected with any of the casing samples tested at 24.7 and 11.1 wt. % BDC glycerine levels. However, sample I at a 7.8 wt. % BDC glycerine level provided casing stuffing breakage for two of the ten pieces of casing tested.

The data also shows that at 7.8 wt. % total plasticizer content, stuffing breakage is not eliminated by increasing the moisture content (prior to presticking, cutting and tying) from 6.3 wt. % to 24.9% BDC (samples I through M). Accordingly, the Table IV data demonstrates that the objects of this invention are not achieved with a total plasticizer content of 7.8 wt. % polyol.

TABLE IV
STUFFING TEST RESULTS

| Sample Number | Casing Glycerine Content (% BDC) | Presticking Tying Moisture Content (% BDC) | Stuffed Diameter (inches) | Breakage Stuffing | Breakage Processing |
| --- | --- | --- | --- | --- | --- |
| G | 24.7 | 6.4 | 3.68 | None | None |
| H | 11.1 | 6.4 | 3.68 | None | None |
| I | 7.8 | 6.3 | 3.66 | 2 | None |
| J | 7.8 | 11.0 | 3.66 | None | None |
| K | 7.8 | 16.8 | 3.67 | 3 | None |
| L | 7.8 | 19.7 | 3.64 | 1 | None |
| M | 7.8 | 24.9 | 3.67 | 1 | None |

EXAMPLE 5

This example shows that reducing the total plasticizer content of the flat stock fibrous casing of this invention does not adversely affect the quality of the first casing tie, when using a Tipper Tie Senior Capper Machine.

Before stuffing the cut flat stock casing in conventional commercial operations, one end of the casing is tied off (first tie). The casing is then fully soaked in water prior to stuffing. The casing is then stuffed with meat emulsion after which the second end of the casing is tied (second tie). The first tie is conventionally applied to the casing by a mechanical apparatus that first pleats the casing end into a compact form over which the tie is applied.

In this example several fibrous casings at two glycerine levels were tied by means of a Tipper Tie Senior Capper machine. This machine, which is manufactured by Tipper Tie, Inc. of Union, New Jersey, places a metal cap over the pleated end of the casing and crimps the cap on the pleated end to produce the first tie. The samples of this example had a moisture of 5.1 to 5.2 wt. % of BDC at the time of applying the first tie. The quality of the first tie on the casing samples was evaluated by the Water Burst Test. The evaluation procedure is as follows:

Water Burst Test Procedure

Tied samples are fully soaked for at least one hour in a vessel containing water. Water is then passed into the casing at a nominal fill rate of 9.1 liters per minute until the casing fails to hold the hydraulic pressure. The maximum pressure at failure and the type of failure are recorded. The failure types are divided into the following three categories:

1. Blown caps—The casing does not break but the cap slips off of the closed end.
2. Body breaks—The casing breaks longitudinally in zipper-like fashion, parallel to the casing machine direction.
3. Tear at the cap—Excessive crimp force by the metal cap results in casing wall damage at the points where the metal cap contacts the casing.

The results of the test are shown in Table V. The quality of the first tie is indicated by the average water burst pressure and the type of casing failure. As shown in Table V, casing samples having a glycerine content of 16.6 wt. % of BDC had average water burst pressure values that were comparable to the average water burst pressure values of the same size casing having a glycerine level of 34.5 wt. % of BDC. Thus, the data shows that reducing the glycerine has no adverse impact on the amount of available water burst pressure.

The data also indicates that at a casing glycerine content of 34.5 wt. % of BDC, maximum water burst is achieved at crimp settings of 10–13, whereas maximum water burst pressures for casing having a glycerine level of 16.6 wt. % of BDC occur at slightly higher crimp settings of 11–14. This higher crimp setting is due to the fact that the casing having the lower glycerine level had a thinner casing wall, thereby requiring a higher crimping pressure in order to enable the cap to properly grip the pleated end of the casing.

The failure frequency data indicates that casings having glycerine content of 16.6 wt. % of BDC have a greater frequency of blown cap failures at a crimp setting of 10 than that of casings having a glycerine content of 34.5 wt. % of BDC. This is due to the fact that casing having the lower glycerine level had a thinner casing wall, thereby allowing greater slippage of the cap off of the pleated end of the casing.

The data also indicates that maximized frequency of body breaks occurs at an optimum range of crimp settings. Maximized frequency of body breaks indicates optimal crimp settings whereby the cap is properly gripping the pleated casing end. This optimum range corresponds to about 11–13 for casings having glycerine content of 16.6 wt. % of BDC and about 10–13 for casings having a glycerine content of 34.5 wt. % of BDC. This small difference in crimp setting is once again due to the thinner casing wall for the lower glycerine content casing.

The data also indicates that excessive crimp settings can result in damage where the cap grips the casing pleats too tightly, thereby resulting in tear-at-cap defects in the water burst test. These defects occur at crimp settings of about 13–15, and they occur at about equivalent frequencies for both casing samples which contained 16.6 wt. % of glycerine and 34.5 wt. % of glycerine based upon the bone dry weight of cellulose.

poor formation of pleats before the cap is attached, when using the Tipper Tie Senior Capper machine.

Data displayed in Table VI indicates the number and percentage of casings that survived the capping operation. The survival of casings having a glycerine content of 11.1 wt. % BDC is generally equivalent to the survival of casings having a higher glycerine content up to moisture levels of about 16 wt. % of BDC. At 20.8 wt. % moisture in the casing, poor pleat formation resulted in unacceptable closures. Accordingly, it is preferred that the moisture content of the flat stock fibrous casing be maintained at a level below about 21 wt. % BDC when using the Tipper Tie Senior Capper machine.

TABLE VI
SENIOR CAPPER TYING SURVIVAL OF REDUCED GLYCERINE CASINGS

| Glycerine Content (% BDC) | Moisture At Time of Tying (% BDC) | Survival N* | Survival % | Non-Survival N* | Non-Survival % | Defect |
|---|---|---|---|---|---|---|
| 29.8 | 6.2 | 67 | 100 | 0 | 0.0 | None |
| 24.7 | 6.4 | 66 | 100 | 0 | 0.0 | None |
| 17.2 | 6.4 | 76 | 100 | 0 | 0.0 | None |
| 11.1 | 6.4 | 61 | 100 | 0 | 0.0 | None |
| 11.1 | 10.8 | 65 | 100 | 0 | 0.0 | None |
| 11.1 | 15.5 | 59 | 100 | 0 | 0.0 | None |
| 11.1 | 20.8 | 68 | 94.4 | 4 | 5.6 | Poor Pleat Formation |
| 11.1 | 25.1 | 21 | 80.8 | 5 | 19.2 | Poor Pleat Formation |

*N means the number of samples.

EXAMPLE 7

This example shows that flat stock fibrous casings having a reduced total plasticizer level in accordance with this invention can be acceptably first tied by means of string tying if sufficient moisture content is present to compensate for plasticizer reduction.

Survival of casings of varying polyol levels was determined for casings tied on a Shokopak string tie machine. The Shokopak string tie machine is commercially supplied by Ludex Handelsgesellschaft, MBH of Hamburg, West Germany. The machine closes the pleated casing end by tying a string loop around the pleats.

TABLE V
TIPPER SENIOR CAPPER TYING QUALITY AS A FUNCTION OF GLYCERINE CONTENT AND CASING THICKNESS (1)

| | Sample I | | | | Sample J | | | |
|---|---|---|---|---|---|---|---|---|
| Glycerine Content (wt. % of BDC) | 16.6 | | | | 34.5 | | | |
| Thickness (mils) | 2.98 | | | | 3.44 | | | |
| | Average Water Burst (mm Hg) | Type of Failure (Number of Pieces) Blown Cap | Type of Failure (Number of Pieces) Body Break | Type of Failure (Number of Pieces) Tear @ Cap | Average Water Burst (mm Hg) | Type of Failure (Number of Pieces) Blown Cap | Type of Failure (Number of Pieces) Body Break | Type of Failure (Number of Pieces) Tear @ Cap |
| Crimp Setting (2) | | | | | | | | |
| 8 | 317 | 5 | 0 | 0 | 321 | 5 | 0 | 0 |
| 9 | 330 | 5 | 0 | 0 | 335 | 5 | 0 | 0 |
| 10 | 342 | 5 | 0 | 0 | 345 | 1 | 4 | 0 |
| 11 | 359 | 3 | 2 | 0 | 346 | 1 | 4 | 0 |
| 12 | 354 | 5 | 0 | 0 | 341 | 0 | 5 | 0 |
| 13 | 360 | 3 | 1 | 1 | 346 | 0 | 3 | 2 |
| 14 | 353 | 0 | 0 | 5 | 305 | 0 | 0 | 5 |
| 15 | 319 | 0 | 0 | 5 | 272 | 0 | 0 | 5 |

(1) Five pieces were tested at each glycerine/crimp setting.
(2) Crimp setting adjustment on the Tipper Senior Capper is a relative, dimensionless value.

EXAMPLE 6

This example illustrates that flat stock fibrous casing having a reduced total plasticizer content in accordance with this invention but having an excessive moisture content exhibits unacceptable first tie quality due to Data displayed in Table VII indicates the number and percentage of casings that survived the string typing operation. The survival of casings having a total polyol plasticizer level of 12.6 wt. % BDC (9.6 wt. % glycerine plus 3.0 wt. % propylene glycol) is generally equivalent to casings having a higher polyolevel of 24.4 wt. % BDC if moisture is maintained in an amount of at least about 17 wt. % of BDC.

TABLE VII

SHOKOPAK TYING SURVIVAL OF REDUCED GLYCERINE CASINGS

| Glycerine Content (% BDC) | Propylene Glycol Content (% BDC) | Moisture At Time of Tying (% BDC) | Survival N* | Survival % | Non-Survival N* | Non-Survival % | Defect |
|---|---|---|---|---|---|---|---|
| 24.4 | 0.0 | 6.7 | 90 | 95.7 | 4 | 4.3 | TEARS |
| 20.6 | 0.0 | 6.8 | 89 | 97.8 | 2 | 2.2 | TEARS |
| 19.2 | 0.0 | 6.7 | 92 | 90.2 | 10 | 9.8 | TEARS |
| 15.6 | 0.0 | 6.4 | 71 | 70.3 | 30 | 29.7 | TEARS |
| 9.6 | 0.0 | 6.8 | 62 | 62.0 | 38 | 38.0 | TEARS |
| 9.6 | 3.0 | 11.4 | 91 | 91.0 | 9 | 9.0 | TEARS |
| 9.6 | 3.0 | 17.4 | 97 | 97.9 | 2 | 2.1 | TEARS |
| 9.6 | 3.0 | 21.2 | 98 | 96.1 | 4 | 3.9 | TEARS |

*N means number of samples

EXAMPLE 8

This example shows that flat stock fibrous casings having a reduced total plasticizer level in accordance with this invention can be acceptably first tied with a Tamaco plastic tie if sufficient compensating moisture content is present.

Survival of Casings of varying polyol plasticizer levers was determined for casings tied on a Tamaco plastic tie machine. The Tamaco plastic tie machine is commercially supplied by Tamaco, Inc. of Arhus, Denmark. The machine closes the pleated casing end by applying a plastic loop around the pleats.

Data displayed in Table VIII indicates the number and percentage of casings that survived the application of the plastic loop. The survival of casings tied with the plastic loop and having a total plasticizer level of 12.6 wt. % BDC {9.6 wt. % glycerine plus 3.0 wt. % propylene glycol) is generally equivalent to the survival of casings having a higher polyol level of 24.4 wt. % BDC if moisture is maintained in an amount of at least about 11 wt. % BDC.

TABLE VIII

TAMACO TYING SURVIVAL OF REDUCED GLYCERINE CASINGS

| Glycerine Content (% BDC) | Propylene Glycol Content (% BDC) | Moisture At Time of Tying (% BDC) | Survival N* | Survival % | Non-Survival N* | Non-Survival % | Defect |
|---|---|---|---|---|---|---|---|
| 24.4 | 0.0 | 6.7 | 106 | 100.0 | 0 | 0.0 | None |
| 20.6 | 0.0 | 6.4 | 96 | 98.0 | 2 | 2.0 | TEARS |
| 19.2 | 0.0 | 6.3 | 91 | 91.9 | 8 | 8.1 | TEARS |
| 15.6 | 0.0 | 6.1 | 98 | 97.0 | 3 | 3.0 | TEARS |
| 9.6 | 0.0 | 6.6 | 82 | 82.0 | 18 | 18.0 | TEARS |
| 9.6 | 3.0 | 11.4 | 102 | 100.0 | 0 | 0.0 | None |
| 9.6 | 3.0 | 16.8 | 98 | 100.0 | 0 | 0.0 | None |
| 9.6 | 3.0 | 22.0 | 94 | 100.0 | 0 | 0.0 | None |

*N means number of samples

EXAMPLE 9

This example shows the effect of casing total plasticizer (polyol) and moisture contents on the presticking quality of flat stock fibrous casings.

When the fibrous casings are employed to produce smoked meat products such as hams, butts, picnics, and the like, and semi-dry sausage products such as cooked bologna, cervelat, and the like, it is desirable to prestick these casings to provide them with holes or perforations which will facilitate the draining of any water, fat or jelly pockets formed during or after processing of the foodstuff encased in the fibrous casings. A method and apparatus for presticking the casings are described in U.S. Pat. No. 3,779,285 to Sinibaldo.

In order to determine the effect of the glycerine content on the casing's presticking quality, several prestuck and non-prestuck cut flat stock fibrous casings with varying levels of glycerine were subjected to the Bursting Strength or Rupture Strength test. Bursting strength is widely used as a measure of tensile properties of many kinds of paper. The apparatus used in the determination of bursting strength is the Mullen Tester, Model C, which is available from B. F. Perkins & Sons, Inc., Mullen Tester Division, Holyoke, Mass. 01040. Reference for this Mullen Tester can be found in TAPPI Standard T403 os-76 or in ASTM standard test D774-67.

The results of this test are shown in Table IX. The results indicate that the presticking quality of flat stock fibrous casings is not adversely affected by the reduction of the casing total plasticizer content, provided that sufficient moisture is present to compensate for total plasticizer reduction. The data indicates that moisture of about 11.3 wt. % of BDC is needed in order to maintain the Mullens Rupture Strength.

Table X illustrates that results were similar for casings produced with a mixture of sorbitol and glycerine. Interpolation of the data shows that a moisture content of about 8.3 wt. % of BDC is required in order to maintain the Mullens Rupture Strength at a reduced polyol level of 10.0 wt. % of BDC. This is equivalent to the Mullens Rupture Strength obtained at a polyol level of 29.3 wt. % of BDC, which is at about the conventional polyol plasticizer level for commercial flat stock fibrous casing.

TABLE IX

PRESTICKING QUALITY - GLYCERINE

| Glycerine Content (% BDC) | Moisture Content (% BDC) | As-is Mullens (1) Rupture Strength (PSI) Prestuck |
|---|---|---|
| 30.9 | 6.6 | 60.3 |
| 10.9 | 6.3 | 52.6 |
| 10.9 | 11.3 | 60.1 |
| 10.9 | 16.3 | 71.6 |

(1) Each set of Mullens data represents the average value from ten randomly picked casing samples.

TABLE X

PRESTICKING QUALITY - GLYCERINE AND SORBITOL

| Plasticizer Content (% BDC) | Moisture Content (% BDC) | As-is Mullens (1) Rupture Strength (PSI) Prestuck |
|---|---|---|
| 29.3 Glyc. | 5.5 | 71.4 |
| 25.8 Glyc. | 5.5 | 70.3 |
| 10.0 (2) | 6.3 | 66.4 |
| 10.0 (2) | 11.3 | 79.0 |

TABLE X-continued

| PRESTICKING QUALITY - GLYCERINE AND SORBITOL | | |
| --- | --- | --- |
| Plasticizer Content (% BDC) | Moisture Content (% BDC) | As-is Mullens (1) Rupture Strength (PSI) Prestuck |
| 10.0 (2) | 16.3 | 82.6 |

(1) Each set of Mullens data represents the average value from ten randomly picked casing samples.
(2) Softener content composed of 4.5% glycerine and 5.5% sorbitol to yield a total of 10% polyol plasticizer.

EXAMPLE 10

The purpose of this test is to show that in terms of stuffing and processing breakage under commercial conditions, the low total plasticizer content casing of this invention provides casing performance which is comparable to casing performance of a casing having a conventional glycerine content. In this example, the plasticizer consisted of 8.8 wt. % glycerine and 3.3 wt. % propylene glycol. This casing containing 12.1 wt. % of total plasticizer was compared to a conventional casing containing 25.2 wt. % glycerine, based upon the bone dry weight of cellulose in the casing.

Two hundred and fifty pieces of cut flat stock fibrous cellulosic casing having a polyol content of 12.1 wt. %, based upon the bone dry weight of cellulose in the casing, and having a moisture content of 12.2 wt. %, based upon the bone dry weight of cellulose in the casing, were tested for stuffing and processing breakage at a commercial packing house under normal operating conditions. The casing had a recommended stuffed diameter of 4.56 inches and the length of each piece was 70 inches. Each piece was stuffed on a Model B PRECISION Sizer machine, using a meat emulsion for the production of bologna sausage. There was no breakage of any casing piece due to the stuffing operation. However, there were three breaks per 250 pieces due to processing conditions in the smoke house.

One hundred and fifty pieces of the same size commercial cut flat stock fibrous cellulosic casing having a glycerine content of 25.2 wt. % and a moisture content of 8.0 wt. %, both weights being based upon the bone dry weight of cellulose in the casing, were similarly tested for stuffing and processing breakage. This casing exhibited no breakage due to the stuffing operation and one break per 150 pieces due to the processing conditions in the smoke house.

EXAMPLE 11

This series of tests shows that the plasticizer of the inventive casing article may comprise a mixture of a polyol and a nonpolyol as long as the plasticized casing contains at least 9 wt. % polyol based on the weight of dry cellulose in the casing. These tests are based on plasticizer mixtures of glycerine and oxazoline wax, the latter being described in the aforementioned O'Brien U.S. Pat. No. '463 as a suitable plasticizer for use with regenerated cellulose casing. The oxazoline wax used in these tests is manufactured by Commercial Solvents Corporation, is sold under the label TS-970, and is described as the reaction product of 1 mole Tris Amino condensed with 3 moles of stearic acid. In these tests, the glycerine and glycerine-oxazoline plasticizers were incorporated into cut flat stock fibrous casing samples by following the procedures described in the O'Brien patent and in Example 1 of the present specification. The resulting plasticized articles were evaluated in terms of the following criteria: presticking quality following the procedure of Example 9, the burst pressure test of Example 1, the first tie quality using the Tipper Tie Senior Capper machine as described in Example 6, and the stuffing and processing breakage tests under commercial conditions as described in Example 4.

To prepare the plasticized articles for these tests, cut flat stock fibrous cellulosic casing samples having a recommended stuffing diameter of 3.45 inches and a length of 30 inches were manufactured in the well-known commercial manner, except that oxazoline wax plasticizer was incorporated into the casing. To prepare casings containing the oxazoline wax, a wax dispersion was incorporated into the viscose during the extrusion process. The glycerine was incorporated by passing the gel stock casing through an aqueous bath containing the glycerine. The oxazoline dispersion was prepared following the procedure described in the O'Brien U.S. Pat. No. '463.

In the presticking quality tests, samples were prepared with relatively low (1.0 wt. %) and relatively high (6.0 wt. %) oxazoline wax content in the low glycerine content (9.2 and 10.8 wt. % respectively plasticized articles of this invention, along with prior art high glycerine content cut flat stock fibrous casing articles as controls (26.2 and 26.0 wt. %, respectively). The test results are summarized in Table XI. "Moisture for Presticking Equivalency" refers to the moisture content of the oxazoline-containing samples which would provide the same presticking quality (As-Is Mullens Rupture Strength) as the high glycerine content control casing articles. Each set of Mullens data represents the average value from ten randomly picked casing samples. The Table XI data may be compared with the glycerine and glycerine-sorbitol 10 wt. % plasticizer data of Tables IX and X.

Based on the Mullens Rupture Strength tests, oxazoline wax is inferior to glycerine as a plasticizer although the glycerine-oxazoline plasticizer performance may be improved by increasing the moisture content. The tests also show that when the plasticized casing article includes 9 wt. % glycerine and an increased moisture content, the Mullens Rupture Strength is at least as high as the prior art high glycerine content casing article.

TABLE XI

| PRESTICKING QUALITY - GLYCERINE AND OXAZOLINE WAX | | | |
| --- | --- | --- | --- |
| Glycerine Content (% BDC) | Oxazoline Content (% BDC) | Moisture Content (% BDC) | As-Is Mullens Rupture Strength (PSI) Prestuck |
| 26.2 | 0.0 | 5.8 | 61.6 |
| 16.9 | 0.0 | 6.1 | 56.4 |
| 10.8 | 6.0 | 7.3 | 52.7 (1) |
| 10.8 | 6.0 | 12.2 | 69.3 (1) |
| 10.8 | 6.0 | 17.0 | 76.3 (1) |
| 26.0 | 0.0 | 8.8 | 64.0 |
| 10.0 | 0.0 | 8.0 | 55.0 |
| 9.2 | 1.0 | 7.7 | 52.4 (2) |
| 9.2 | 1.0 | 12.6 | 64.7 (2) |
| 9.2 | 1.0 | 17.4 | 70.9 (2) |

(1) Moisture for presticking equivalency is 10.6 wt. % BDC.
(2) Moisture for presticking equivalency is 12.5 wt. % BDC.

In the casing strength (burst pressure) tests, the first group involved a total plasticizer content of 16-17 wt. %, using a prior art high glycerine content cut flat stock fibrous casing article as control. The test results are summarized in Table XII. They demonstrate a substantial improvement in burst pressure at the upper end of the low plasticizer content range of this invention for the "glycerine only" system (535 vs. 514 mm Hg.). When oxazoline wax was partially substituted for glycerine at about the same total plasticizer content, the burst pressure decreased to a level which was about equivalent to the high glycerine content prior art casing article (26.2 wt. %).

The second group of casing strength tests shown in Table XII involved a total plasticizer content of only about 10 wt. %, and they also demonstrate a substantial improvement in burst pressure for casings containing "glycerine only" at the lower end of the plasticizer content range of this invention (535 vs. 512 mm Hg). This improvement was maintained when 1.0 wt. % oxazoline wax replaced an equivalent amount of the glycerine plasticizer content, but when the oxazoline content was increased to 2.0 wt. %, the burst pressure declined to about the same level as the prior art high glycerine content article. This data supports the requirement that the plasticized article of this invention include at least 9 wt. % polyol, such as glycerine.

TABLE XII

CASING STRENGTH AS A FUNCTION OF GLYCERINE AND OXAZOLINE WAX CONTENT

| Glycerine Content (% BDC) | Oxazoline Content (% BDC) | Burst Pressure (mm Hg) |
| --- | --- | --- |
| 26.2 | 0.0 | 514 |
| 16.9 | 0.0 | 535 |
| 12.8 | 4.0 | 510 |
| 10.8 | 6.0 | 514 |
| 9.6 | 7.5 | 518 |
| 6.2 | 10.0 | 514 |
| 26.0 | 0.0 | 512 |
| 10.0 | 0.0 | 535 |
| 9.2 | 1.0 | 535 |
| 8.1 | 2.0 | 506 |
| 7.3 | 3.0 | 517 |

Tests were conducted to demonstrate the first tie survival with glycerine-oxazoline plasticized casing articles when using the Tipper Tie Senior Capper machine, and the results are summarized in Table XIII. The first group of tests included various oxazoline contents at the upper end of the total plasticizer content of this article (about 17 wt. %). These tests show that the tie survival is unaffected by oxazoline contents of up to at least 6.0 wt. %, but the survival diminishes when the oxazoline content is increased to 7.5 wt. % and the glycerine content is decreased to 9.6 wt. %. The defect was tearing of the casing, indicating that oxazoline wax is inferior to glycerine as a plasticizer.

The second group of tie survival tests included various oxazoline contents at the lower end of the total plasticizer content of this article (about 10 wt. %). These tests show that the tie survgival diminishes when the oxazoline content is increased above about 1.0 wt. %, thereby demonstrating the importance of employing at least 9 wt. % polyol in the plasticized casing article of the invention.

TABLE XIII

SENIOR CAPPER TYING SURVIVAL OF REDUCED GLYCERINE CASINGS WITH OXAZOLINE WAX

| Glycerine Content (% BDC) | Oxazoline Content (% BDC) | Moisture at time of Tying (% BDC) | Survival N* | Survival (%) | Non-Survival N* | Non-Survival (%) | Defect |
| --- | --- | --- | --- | --- | --- | --- | --- |
| 26.0 | 0.0 | 5.8 | 100 | 100.0 | 0 | 0.0 | None |
| 16.9 | 0.0 | 6.1 | 100 | 100.0 | 0 | 0.0 | None |
| 12.8 | 4.0 | 6.8 | 100 | 100.0 | 0 | 0.0 | None |
| 10.8 | 6.0 | 7.3 | 100 | 100.0 | 0 | 0.0 | None |
| 9.6 | 7.5 | 7.3 | 90 | 90.0 | 10 | 10.0 | Tearing |
| 6.2 | 10.0 | 7.4 | 104 | 89.7 | 12 | 10.3 | Tearing |
| 10.0 | 0.0 | 8.0 | 100 | 100.0 | 0 | 0.0 | None |
| 9.2 | 1.0 | 7.7 | 100 | 100.0 | 0 | 0.0 | None |
| 8.1 | 2.0 | 8.2 | 87 | 88.8 | 11 | 11.2 | Tearing |
| 7.3 | 3.0 | 7.7 | 84 | 89.4 | 10 | 10.6 | Tearing |

*N means the number of samples.

Another group of tests was performed which shows that in terms of the stuffing performance, casing articles with glycerine-oxazoline plasticizer mixtures within the 10–17 wt. % BDC total plasticizer range, and including at least 9 wt. % polyol, are comparable to high glycerine content cut flat stock casing articles. The casing used in these tests had a recommended stuffed diameter of 3.45 inches and the length of each piece was 30 inches. The test procedure was identical to that described in connection with Example 4, using a Model B PRECISION Sizer machine and a typical emulsion for the production of bologna sausage.

The plasticizer mixtures used in these tests included samples with total plasticizer content at the upper end of the total plasticizer range of this invention, but including as much as 6.0 wt. % oxazoline wax, and other samples with total plasticizer content at the low end of this range, but including 1.0 wt. % oxazoline wax. For control purposes, the low total plasticizer samples were compared with prior art high glycerine content samples (26.2 and 26.0 wt. %, respectively). Ten samples of each type were tested. The samples were examined from the standpoint of casing breakage during both stuffing and processing.

The results of these tests are summarized in Table XIV, and show no stuffing or processing breakage.

TABLE XIV

STUFFING EVALUATION WITH GLYCERINE AND OXAZOLINE WAX PLASTICIZER

| Glycerine Content (% BDC) | Oxazoline Content (% BDC) | Breakage[1] Stuffing | Breakage[1] Processing |
| --- | --- | --- | --- |
| 26.2 | 0.0 | 0/10 | 0/10 |
| 12.8 | 4.0 | 0/10 | 0/10 |
| 10.8 | 6.0 | 0/10 | 0/10 |
| 26.0 | 0.0 | 0/10 | 0/10 |
| 9.2 | 1.0 | 0/10 | 0/10 |

[1]Breakage values indicate the number of observed breaks out of ten samples.

While this invention has been described with reference to certain specific embodiments, it will be recognized by those skilled in this art that many variations are possible without departing from the scope and spirit of the invention, and that it is intended to cover all changes and modifications of the invention disclosed herein for the purposes of illustration, which do not constitute departure from the spirit and scope of the invention.

What is claimed is:

1. A method of manufacturing a food product in a flat stock fibrous casing which comprises the steps of:
   a. providing a flat stock fibrous casing having a total plasticizer content of between about 10 wt. % and about 17 wt. %. including at least about 9 wt. % polyol, and at least about 8 wt. % water, all based upon the weight of bone dry cellulose in the casing.
   b. mounting one end of said casing on a stuffing machine and filling said casing with edible material, and
   c. processing the edible materialfilled casing to convert said edible material to a finished food product.

2. A method of manufacturing a food product in a cut flat stock fibrous casing which comprises the steps of:
   a. providing a cut flat stock fibrous casing with one closed end and one open end, said casing having a total plasticizer content of between about 10 wt. % and about 17 wt. %, including at least about 9 wt. % polyol, and between about 35 wt. % and about 72 wt. % water, all based upon the weight of bone dry cellulose in the casing.
   b. mounting the open end of said casing on a stuffing machine and filling said casing with edible material,
   c. closing the open end of the edible material-filled casing, and
   d. processing the edible material-filled casing to convert said edible material to a finished food product.

3. The method of claim 2 wherein said casing has between about 35 wt. % and about 53 wt. % water, based upon the weight of bone dry cellulose in the casing, and said finished food product is bologna.

4. The method of claim 2 wherein said casing has between about 43 wt. % and about 72 wt. % water, based upon the weight of bone dry cellulose in the casing, and said finished food product is ham.

* * * * *

UNITED STATES PATENT AND TRADEMARK OFFICE
CERTIFICATE OF CORRECTION

PATENT NO. : 4,748,036

DATED : May 31, 1988

INVENTOR(S) : James R. Hansen/Jerome J. M. Rasmussen

It is certified that error appears in the above-identified patent and that said Letters Patent is hereby corrected as shown below:

In col. 1, line 29, change "hased" to -- based --.

In col. 1, line 39, change "he" to -- be --.

In col. 1, line 43-44, change "comhination" to -- combination --.

In col. 2, line 45, change "fihrous" to -- fibrous --.

In col. 2, line 64, change "fihrous" to -- fibrous --.

In col. 3, line 47, change "tuhe" to -- tube --.

In col. 4, line 45, change "he" to -- be --.

In col. 6, line 39, after the word "with" insert -- the present --

In col. 8, line 64, change "light" to -- lighter --.

In col. 16, line 22, after "respectively" insert -- ) --.

UNITED STATES PATENT AND TRADEMARK OFFICE
CERTIFICATE OF CORRECTION

PATENT NO. : 4,748,036

DATED : May 31, 1988

INVENTOR(S) : James R. Hansen/Jerome J.M. Rasmussen

It is certified that error appears in the above-identified patent and that said Letters Patent is hereby corrected as shown below:

In col. 17, line 54, change "surgvival" to --survival--.

Signed and Sealed this

Eighth Day of May, 1990

*Attest:*

HARRY F. MANBECK, JR.

*Attesting Officer*  *Commissioner of Patents and Trademarks*